Aug. 29, 1961 K. C. WALLINGFORD 2,998,257
INDEXING CHUCK

Filed June 11, 1959 3 Sheets-Sheet 1

INVENTOR.
Kenneth C. Wallingford
BY
ATTORNEY

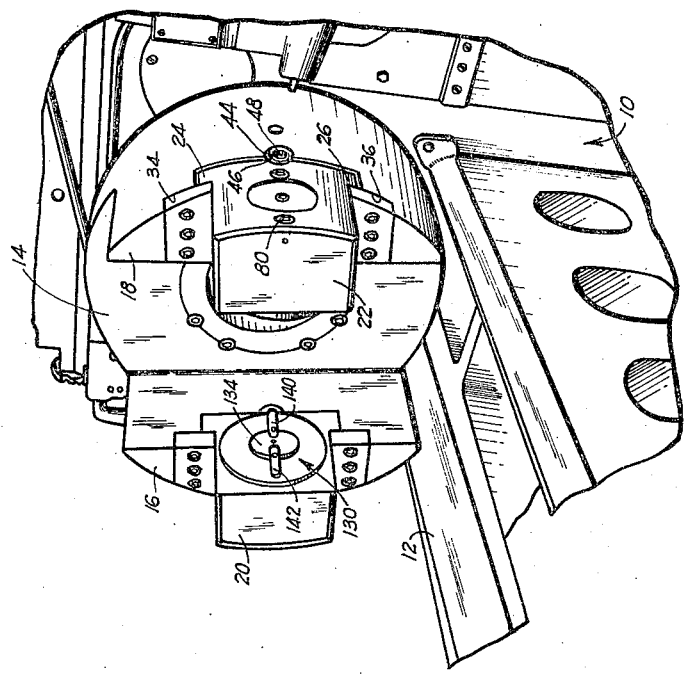
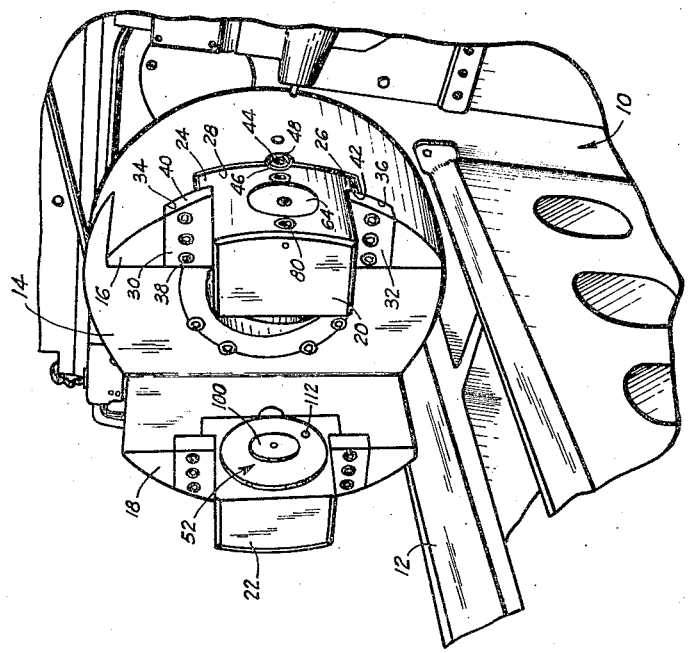

Aug. 29, 1961     K. C. WALLINGFORD     2,998,257
INDEXING CHUCK

Filed June 11, 1959     3 Sheets-Sheet 3

INVENTOR.
Kenneth C. Wallingford
BY
ATTORNEY

United States Patent Office 2,998,257
Patented Aug. 29, 1961

2,998,257
INDEXING CHUCK
Kenneth C. Wallingford, Tulsa, Okla., assignor to Unit Rig & Equipment Company, Tulsa, Okla., a corporation of Delaware
Filed June 11, 1959, Ser. No. 819,668
10 Claims. (Cl. 279—5)

This invention relates to improvements in lathes, and more particularly, but not by way of limitation, to an improved indexing chuck for a turret lathe.

In the manufacture or production of many articles, portions thereof are often cast in molds for facilitating the mass production. The rough castings are frequently machined in order to provide the desired dimension and surface for the finished product. The casting is normally machined in a lathe, and particularly in the case of large castings, such as large valve bodies, and the like, the casting is retained on a turret lathe by an indexing chuck. The work piece to be machined may be pivoted in the lathe by means of the chuck whereby a plurality of variably disposed surfaces may be machined without removing the piece from the lathe. However, many problems are encountered in the machining of large rough castings. For example, the rough casting may not be of a uniform dimensional size whereby one side of the casting may be smaller than the opposed side thereof. In this event, the usual practice today is to clamp one side of the work piece in the lathe and merely guide or support the opposite side during the cutting operation. It will be apparent that this type of chucking or clamping of the work piece to be machined will not be efficient in the cutting or machining of heavy steel.

The present invention contemplates a novel indexing chuck for a turret lathe wherein the work piece may be securely held in the lathe regardless of any irregularities in the casting or work piece being machined thereby. The novel indexing chuck is particularly designed and constructed to compensate for any dimensional variances in the opposite sides of the work piece, and maintain a secure clamping thereof at all times during the machining operation. In addition, the work piece may be readily pivoted in the chuck for machining a plurality of surfaces without removal of the work piece from the lathe. The chuck is provided with means for assuring a proper alignment of the work piece in all positions for machining the various surfaces thereof, thus providing for an efficient operation of the lathe.

It is an important object of this invention to provide a novel indexing chuck for a lathe for maintaining a work piece securely on the lathe during the machining thereof.

It is another object of this invention to provide a novel indexing chuck for a turret lathe for receiving a work piece whereby the work piece may be readily pivoted in the lathe for facilitating the machining of a plurality of surfaces thereof without removal of the work piece from the lathe.

Another object of this invention is to provide a novel indexing chuck for a turret lathe wherein a proper alignment of the work piece is assured in the variable positions of the work piece in the lathe for the machining of the plurality of surfaces thereof.

Still another object of this invention is to provide a novel indexing chuck for a lathe particularly designed and constructed to compensate for any variance in size of the opposed sides of the work piece secured therein.

A further object of this invention is to provide a novel indexing chuck for a lathe wherein the work piece is securely clamped on both sides thereof regardless of the variance in size of the work piece for facilitating the machining operation.

A still further object of this invention is to provide a novel indexing chuck for a turret lathe which is simple and efficient in operation and economical and durable in construction.

Other objects and advantages of the invention will be evident from the following detailed description, read in conjunction with the accompanying drawings, which illustrate my invention.

In the drawings:

FIGURE 3 is a perspective view similar to FIG. 1 with portions of the indexing chuck deleted for purposes of illustration.

FIGURE 4 is a view similar to FIG. 3 depicting another portion of the indexing chuck.

Figure 1:
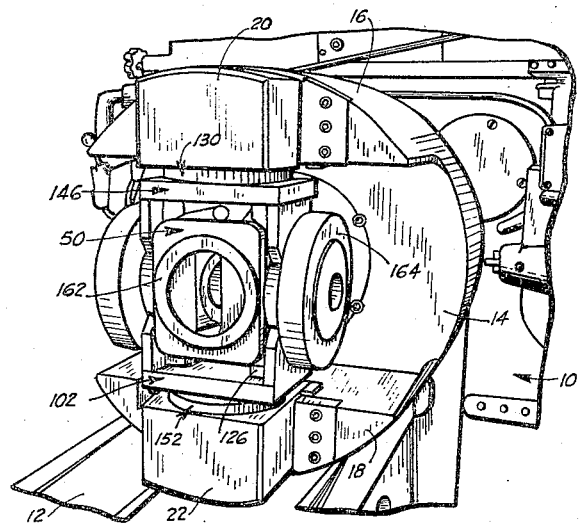
FIGURE 1 is a perspective view of a portion of a turret lathe having an indexing chuck disposed thereon embodying the invention, and engaging a work piece.

Referring to the drawings in detail, reference character 10 refers in general to a turret lathe having the usual lathe bed 12 provided thereon. A circular chuck body 14 is disposed adjacent one end of the lathe bed 12 and secured to the lathe 10 in any well known manner (not shown). The chuck body 14 is provided with a pair of oppositely disposed substantially semi-circular shaped jaw receiving portions 16 and 18, each of which is adapted to receive a master jaw 20 and 22, respectively.

The master jaws 20 and 22 are substantially identical and are provided with oppositely disposed outwardly extending flanges 24 and 26 adapted to fit in a recess portion 28 provided in each of the jaw receiving portions 16 and 18. A pair of oppositely disposed plates 30 and 32 are disposed in a recess or cut away portion 34 and 36, respectively, provided adjacent the recess 28, and are secured therein by a plurality of bolts 38 whereby the plates 30 and 32 overlap the recess 28 at 40 and 42, respectively, for retaining the flanges 24 and 26 adjacent the chuck body 14. It will be apparent that both the master jaws 20 and 22 are similarly secured to the jaw receiving portions 16 and 18.

The flanges 24 and 26 of each of the master jaws 20 and 22 are slidably retained within the respective recess 28 by the plates 30 and 32. A semi-circular threaded recess 44 is provided in each of the master jaws 20 and 22. The recesses 44 are disposed adjacent the recess 28 of each jaw receiving portion 16 and 18 and are in substantial alignment with a complementary semi-circular threaded recess 46 provided in each of the jaw receiving portions. A translation screw 48 of the socket head type, or the like, is threadedly secured in each pair of the cooperating recesses 44 and 46 whereby threading of the screws 48 will reciprocate the master jaws 20 and 22 radially inwardly and outwardly in the recesses 28 with respect to the circular chuck body 14. The master jaws 20 and 22 may thus be adjusted independently for clamping a work piece 50 therebetween, as will be hereinafter set forth.

Figure 2:
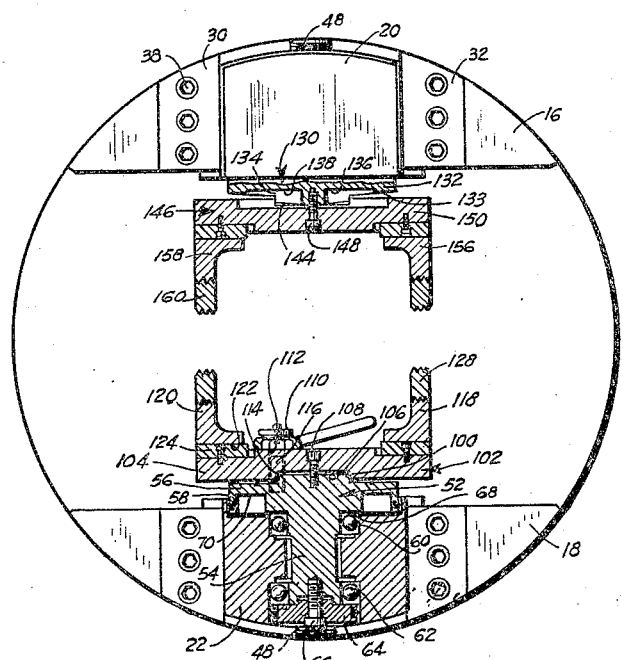
FIGURE 2 is an end elevational view partly in section of an indexing chuck embodying the invention.
Figure 5:
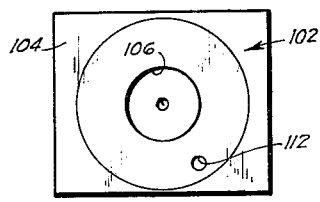
FIGURE 5 is a rear elevational view of one of the working jaws of the indexing chuck.
Figure 7:
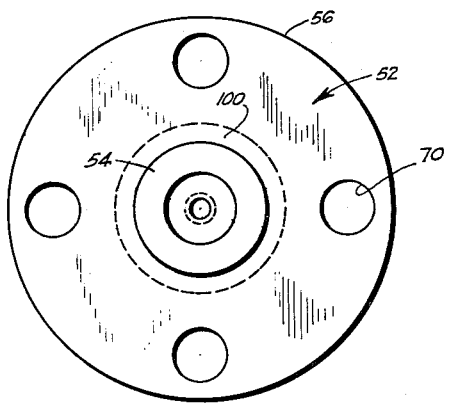
FIGURE 7 is a detail view of a portion of the indexing chuck.
Figure 8:
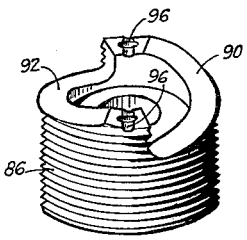
FIGURE 8 is a perspective view of the cam screw member of the indexing chuck.

The master jaw 22 is provided with a rotatable trunnion 52 extending longitudinally therethrough. The trunnion 52 comprises a shank portion 54 having an enlarged head portion 56 at one end thereof disposed within a recess 58 provided in the master jaw 22. The shank 54 is journalled in the master jaw 22 by a pair of spaced bearing members 60 and 62. A plate member 64 is secured to the opposite end of the shank 54 by a suitable screw 66 for retaining the bearing 62 and trunnion 52 in the master jaw 22. The enlarged head portion 56 of the trunnion 52 provides an outwardly extending circumferential shoulder 68 adjacent the shank portion 54. A plurality of apertures or bores 70 are circumferentially spaced on the shoulder 68 around the shank 54, as shown in FIGS. 2 and 7. Four bores 70 spaced ninety degrees apart are depicted in FIG. 7. However, it is not intended to limit the bores to four as shown, but as many bores as desired may be provided, at substantially any angular spacing therebetween for facilitating rotation and locking of the trunnion 52 as will be hereinafter set forth.

Figure 9:
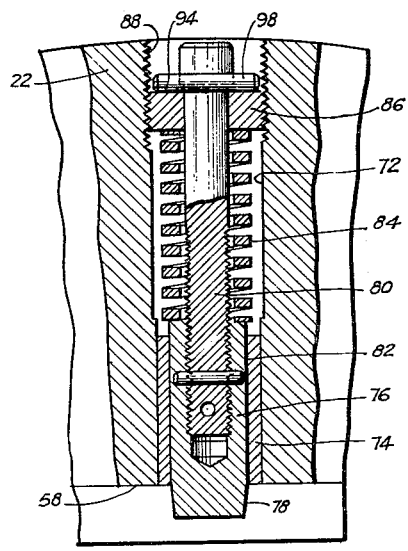
FIGURE 9 is a broken sectional view of the spring urged locking pins provided in the indexing chuck.

A plurality of bores 72 (FIG. 9), preferably two spaced one hundred and eighty degrees apart, but not limited thereto, extend longitudinally through the master jaw 22, and are spaced from the longitudinal center of the trunnion 52 an equal distance with the bores 70, whereby the bores 72 will be in alignment with an opposed pair of the apertures 70 in certain positions of the trunnion 52 within the master jaw 22, as will be hereinafter set forth. A bushing 74 is secured in the bore 72 adjacent the groove 58 in any well known manner (not shown) for receiving a slidable pin 76 therein. The pin 76 is provided with a tapered end portion 78 which normally extends into the recess 58, as clearly shown in FIG. 9, and adapted to be disposed within one of the bores 70 upon proper positioning of the trunnion 52 within the master jaw 22. An Allen head screw or guide stem 80 is threadedly secured to the pin 76 and is secured therein by a transverse pin 82 whereby the stem 80 and pin 76 reciprocate simultaneously within the bore 72. A spring 84 is disposed around the guide stem 80 and has one end anchored on the pin 76 and the opposite end anchored on a cam screw 86 whereby the spring 84 constantly urges the pin 76 downwardly, as viewed in FIG. 9.

The cam screw 86 is threadedly secured at 88 within the bore 72 and is provided with opposed complementary cam surfaces 90 and 92 at the upper surface 94 thereof. The uppermost portion of each cam surface 90 and 92 is provided with a transversely extending groove 96 for receiving the opposed end portions of a pin 98 therein. The pin 98 extends through the screw or guide stem 80, as clearly shown in FIG. 9, and is secured therein in any well known manner (not shown). When the pin 98 is resting in the grooves 96, the guide stem 80 is supported in a raised position (not shown) within the bore 72 whereby the pin 76 is lifted in the bore 72 to a position out of the groove 58. The grooves 96 cooperate for retaining the pin 98 in the uppermost position of the cam surfaces 90 and 92 and preclude an accidental movement of the pin along the cam surfaces. When it is desired to lower the pin 76 into the groove 58 whereby contact may be made with the bores 70, the stem 80 is rotated in order to move the opposed ends of the pin 98 downwardly along the cam surfaces 90 and 92 for a simultaneous lowering of the pin 76 into the groove 58.

With the pin 76 and guide stem 80 in the raised position, the trunnion 52 may be rotated within the master jaw 22 to substantially any desired position with respect thereto. However, when it is desired to lock the trunnion 52 within the master jaw 22, the pin 76 is moved to the lowered position within the bore 72 by rotation of the stem 80, as hereinbefore set forth. In the lowered position of the pin 76, the spring 84 will snap the tapered end 78 thereof into one of the bores 70 when the trunnion 52 is rotated to a position wherein one of the bores 70 is in alignment with the bore 72. The engagement of the pin 76 with the bore 70 will securely lock the trunnion 52 within the master jaw 22. It will be apparent that two diametrically opposed pins 76 engaging a pair of oppositely disposed bores 70 will efficiently preclude any further rotation of the trunnion 52 within the master jaw 22 to assure an efficient alignment of the trunnion 52, as will be hereinafter set forth.

The enlarged head portion 56 of the trunnion 52 is provided with an axially extending circular boss member 100 (FIG. 2) oppositely disposed from the bore 70 for receiving a working jaw 102 thereon. The working jaw 102 comprises a substantially rectangular plate member 104 having a centrally disposed circular recess 106 adapted to receive the boss 100 for properly aligning the working jaw 102 on the trunnion 52. The working jaw 102 is removably secured to the trunnion 52 in any well known manner, such as the screw 108. In addition, a cap screw 110 extends through a bore 112 provided in the plate 104 and is threadedly secured in a bore 114 provided in the trunnion head portion 56 for cooperating with the screw 108 to retain the working jaw 102 securely on the trunnion 52. The bore 112 is preferably slightly larger than the shank 116 of the screw 110 in order that a lost motion area will be provided therebetween. In this manner, a considerable amount of play will be provided between the plate 104 and the trunnion 52 in a rotational direction, thus assuring a proper alignment of the working jaw 102 regardless of inaccuracies of the dimensions of the work piece 50, as will be hereinafter set forth.

A pair of oppositely disposed upstanding flanges 118 and 120 are adjustably secured to the plate 104 in any well known manner, such as a key way 122 and cooperating key 124, whereby the flanges may be moved toward or away from each other, as desired. A re-enforcing block 126 (FIG. 1) is preferably disposed adjacent the inner face of each of the flanges 118 and 120 and is suitably bolted, or the like (not shown) to the plate 104. Each of the flanges 118 and 120 is provided with an arcuate holding surface 128 at the uppermost end thereof for receiving the work piece 50 therein, as is well known.

The master jaw 20 is provided with a rotatable trunnion 130 similar to the trunnion 52, and similarly retained therein. However, the head portion 132 of the trunnion 130 is provided with a centrally disposed circular boss 134 having a pair of oppositely disposed radially extending key ways 136 and 138 provided therein for receiving a key member 140 and 142, respectively (FIG. 4). For purposes of illustration, the key members 140 and 142 have been omitted from FIG. 2. In addition, the exposed surface 144 of the boss 134 is tapered inwardly from the center thereof, as shown in FIG. 2, whereby the outer periphery thereof is recessed or disposed rearwardly with respect to the center thereof, for a purpose as will be hereinafter set forth. The outer face 133 of the head portion 132 is tapered complementary to the surface 144 of the boss 134.

Figure 6:
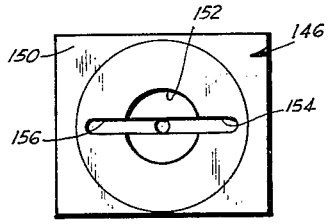
FIGURE 6 is a rear elevational view of the second working jaw of the indexing chuck.

A second working jaw 146 similar to the jaw 102 is secured to the trunnion 130 by a suitable screw 148. The working jaw 146 comprises a substantially flat plate member 150 having a centrally disposed circular recess 152 (FIG. 6) and a transversely extending elongated recess 154 for receiving the boss 134 and key members 140 and 142 therein. In this manner, the working jaw 146 is properly aligned with respect to the trunnion 130, and the key members 140 and 142 cooperate with the recess 154 for precluding relative rotation between the working jaw 146 and the trunnion 130. The plate 150 is provided with a pair of oppositely disposed outwardly depending flanges 156 and 158 adjustably secured thereto in the manner hereinbefore set forth with respect to the flanges 118 and 120 of the working jaw 102. Each of the flanges 156 and 158 is provided with an arcuate shaped holding portion 160 at the outer end thereof for cooperating with the holding portions 128 of the flanges 118 and 120 to clamp the work piece 50 securely therebetween, as is well known.

It will be apparent that the tapered surfaces 144 and 133 of the trunnion 130 will permit a rocking action of the working jaw 146 with respect to the trunnion 130, thus providing for a play between the working jaw 146 and the master jaw 20 whereby any discrepancy of dimensions in the work piece 50 will be compensated for, and still provide for a secure clamping of the work piece 50 between the working jaws 102 and 146.

Operation

When it is desired to machine the work piece 50, the chuck body 14 is preferably disposed with respect to the lathe 10 in such a manner that the master jaws 20 and 22 are vertically disposed as shown in FIG. 1. It is to be understood that either master jaw may be placed in the lowermost position, and for purposes of illustration herein, the master jaw 22 is depicted at the lowermost position on the chuck body 14.

The work piece 50 may be disposed on the arcuate holding portions 128 of the working jaw 102 in any well known manner (not shown). The arcuate clamping or holding portions 128 of the working jaw 102 are then moved into clamping position against the work piece 50 by moving the master jaw 20 in a direction toward the master jaw 22 through utilization of the translation screw 48. In the event that the opposed sides of the work piece 50 clamped between the working jaws 102 and 146 are not in exact alignment with each other, the play between the working jaw 102 and the trunnion 52 will permit the working jaw 102 to seek the proper positioning, rotationwise, with respect to the trunnion 52 for securely clamping the work piece 50. In addition, any size differentials between the opposed sides of the work piece 50 will be compensated for by the rocking action of the lower working jaw 146 with respect to the trunnion 52. When the working jaws 102 and 146 have thus been properly positioned against the work piece 50, the master jaws 20 and 22 may both be urged in a direction toward each other by the translation screws 48 for securely clamping the work piece 50 in the chuck 14 during the machining operation on the work piece.

The lathe 10 may be utilized in any well known manner for machining the front face 162 of the work piece 50, or any other portion thereof as desired with the work piece in the initial position as shown in FIG. 1. After the machining operation of the front face 162 has been completed, the trunnions 52 and 130 may be rotated in the master jaws 20 and 22 for rotating the work piece 50 within the chuck 14 whereby the right hand face 164, as viewed in FIG. 1, will be moved into the machining position on the lathe 10. In order to rotate the trunnions, the cap screws or guide stems 80 are rotated in a direction whereby the transverse pin 98 rides upwardly on the cam surfaces 90 and 92 for simultaneously lifting the stem 80 and tapered pin 76 within the bore 72 and out of contact with the bores 70. Thus, the trunnions 52 and 130 are free for rotation within the master jaws 20 and 22. The trunnions may be rotated therein by a manual rotation of the work piece 50, which is securely clamped between the working jaws 102 and 146.

As soon as the trunnions have been rotated a sufficient distance to clear the bores 70 wherein the pins 76 were previously positioned, the cap screws 80 are rotated in an opposite direction for moving the pin 98 downwardly on the cam surfaces 90 and 92 and simultaneously lowering the pin 76 within the bore. The trunnions are further rotated until the pins 76 are brought into alignment with the next succeeding pair of opposed bores 70, whereupon the spring 84 will snap the pins 76 into the bores 70 and lock the trunnions in the master jaws 20 and 22. It will be apparent that the spacing between the bores 70 will determine the angular distance of rotation of the trunnions. For example, if the bores 70 are spaced ninety degrees apart, the trunnions will be rotated through a distance of ninety degrees between each locking position.

With the trunnions once again locked within the master jaws 20 and 22, the right hand face 164 of the work piece 50 will be in the machining position on the lathe 10, and may be machined in any well known manner (not shown). The operation may be continued until all the desired faces or portions of the work piece have been machined. Then, the upper jaw 20 may be backed away from the lower jaw 22 by the translation screw 48 whereby the work piece will be released from the clamped position therebetween.

From the foregoing, it will be apparent that the present invention provides a novel indexing chuck for a turret lathe wherein a work piece may be securely clamped therein regardless of any dimensional discrepancy of the work piece. The opposed sides of the work piece are securely clamped for assuring an efficient machining of all portions thereof. The work piece may be readily rotated in the chuck, and properly aligned at all times in the lathe for an efficient machining thereof. The novel indexing chuck is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

I claim:

1. An indexing chuck for a lathe comprising means for securing a work piece on the lathe, means cooperating with the first mentioned means for compensating for dimensional discrepancies of the work piece, and means cooperating between the first and second mentioned means for rotating the work piece in the lathe.

2. An indexing chuck for securing a work piece in a lathe, and comprising clamping means for securing the work piece, means cooperating with the clamping means for compensating for dimensional differentials in the work piece in the clamped position thereof, means cooperating with the clamping means for rotation of the work piece in the lathe, and means cooperating with the last mentioned means for aligning the work piece in the lathe upon rotation thereof without reclamping of the work piece.

3. An indexing chuck for securing a work piece in a lathe, and comprising a chuck body, a plurality of master jaws carried by the chuck body, a working jaw carried by each master jaw, means cooperating between the master jaws and working jaws for rotation of the work piece in the lathe, means cooperating between the first mentioned means and the working jaws to compensate for dimensional differentials of the work piece in the clamped position, and means cooperating between the first mentioned means and the master jaws for proper alignment of the work piece in the lathe upon rotation thereof.

4. An indexing chuck for securing a work piece in a lathe, and comprising a chuck body, a pair of oppositely disposed master jaws slidably disposed on the chuck body, trunnion means rotatably disposed in each master jaw, a working jaw secured to each trunnion means for clamping the work piece therebetween, said working jaws adapted for rotation simultaneously with the trunnion means, means cooperating between the trunnion means and the master jaws for aligning the work piece in the lathe upon rotation of the working jaws, and means cooperating between the trunnion means and working jaws to compensate for any dimensional differentials in the work piece in the clamped position.

5. An indexing chuck for securing a work piece in a lathe, and comprising a pair of oppositely disposed working jaws carried by the chuck for receiving the work piece therebetween, means provided on the chuck for clamping the working jaws securely on the work piece, means carried by the chuck for rotation of the working jaws for rotating the work piece in the lathe, means cooperating between the working jaws and the last mentioned means to compensate for dimensional differentials in the work piece in the clamped position, and means assuring proper alignment of the work piece upon rotation thereof in the lathe.

6. An indexing chuck comprising a chuck body, a pair of oppositely disposed master jaws carried by the chuck body, means cooperating between the master jaws and chuck body for reciprocal movement of the master jaws, trunnion means rotatably disposed in each master jaw, a working jaw carried by each trunnion means for receiving a work piece therebetween, means cooperating between one of said trunnion means and one of said working jaws to permit limited rotational movement therebetween to compensate for dimensional differentials in the work piece, means cooperating between a second trunnion means and its respective working jaw to permit a rocking motion of said working jaw relative to said second trunnion means to further compensate for dimensional differentials in the work piece, and means cooperating between each of the trunnion means and the master jaws for locking the trunnion means in a plurality of positions relative to the master jaws, said working jaws and work piece rotatable with said trunnion means and locked therewith in a plurality of positions relative to the chuck body.

7. An indexing chuck comprising a chuck body, a pair of oppositely disposed master jaws slidably carried by the chuck body, trunnion means rotatably disposed in each master jaw, a working jaw carried by each trunnion means and rotatable therewith, clamping portions provided on each working jaw for clamping a work piece therebetween, means cooperating between the master jaws and the trunnion means for locking the trunnion means in a plurality of positions relative thereto whereby the working jaws and work piece may be locked in a plurality of positions relative to the chuck body, one of said trunnion means provided with a tapered surface to permit a rocking motion of one of said working jaws relative thereto for compensation of dimensional differentials in the work piece in the clamped position, and means cooperating between the other of said trunnion means and working jaws to provide for further compensation of dimensional differentials in the work piece.

8. An indexing chuck comprising a chuck body, a pair of master jaws slidably secured to the chuck body, trunnion means rotatably disposed in one of said master jaws, a working jaw secured to the trunnion means and rotatable therewith, means cooperating between the trunnion means and working jaw to preclude rotation therebetween, means cooperating between the trunnion means and working jaw to provide for a rocking action of the working jaw relative to the trunnion means, second trunnion means rotatably disposed in the other of said master jaws, a second working jaw secured to the second trunnion means and rotatable therewith, means cooperating between the trunnion means and working jaw to provide for limited rotational movement therebetween, and means cooperating between both of said trunnion means and said master jaws for locking the trunnion means in a plurality of positions relative to the master jaws to provide a plurality of rotative positions for the working jaws relative to the chuck body.

9. An indexing chuck for securing a work piece in a lathe, and comprising a pair of oppositely disposed master jaws slidably disposed in the chuck body, means cooperating between the chuck body and the master jaws for reciprocal movement of the master jaws relative thereto, trunnion means rotatably carried by each master jaw, a working jaw carried by each trunnion means and rotatable therewith, at least one of said trunnions having a tapered face adjacent the respective working jaw to provide a rocking motion of the working jaw relative thereto, means cooperating between the other of said trunnion means and the respective working jaw to permit limited rotational movement therebetween, clamping means provided on each working jaw for clamping the work piece therebetween, said rocking movement and limited rotational movement compensating for dimensional differentials in the work piece in the clamped position, and means cooperating between the master jaws and the trunnion means for locking the work piece in a plurality of positions with respect to the lathe without reclamping of the work piece.

10. An indexing chuck for securing a work piece in a lathe, and comprising a pair of oppositely disposed master jaws slidably disposed in the chuck body, means cooperating between the chuck body and the master jaws for reciprocal movement of the master jaws, trunnion means rotatably carried by each master jaw, a working jaw carried by each trunnion means and rotatable therewith, at least one of said trunnions having a tapered face adjacent the respective working jaw to provide a rocking motion of the working jaw relative thereto, said one of said trunnions provided with means precluding relative rotation of the respective working jaw, means cooperating between the other of said trunnion means and the respective working jaw to permit limited rotational movement therebetween, clamping means provided on each working jaw for clamping the work piece therebetween, said rocking movement of one working jaw cooperating with the limited rotational movement of the other working jaw compensating for dimensional differentials in the work piece in the clamped position to provide positive clamping for the work piece, and means cooperating between the master jaws and the trunnion means for locking the work piece in a plurality of positions with respect to the lathe without reclamping of the work piece.

References Cited in the file of this patent

UNITED STATES PATENTS

| 2,643,132 | Hunziker | June 23, 1953 |
| 2,732,216 | Sloan et al. | Jan. 24, 1956 |

FOREIGN PATENTS

| 1,086 | Great Britain | Nov. 21, 1896 |